June 17, 1924.

M. W. HARVEY

MOLDING MACHINE OR PRESS

Filed Nov. 2, 1921

1,498,373

2 Sheets-Sheet 1

June 17, 1924.

M. W. HARVEY

MOLDING MACHINE OR PRESS

Filed Nov. 2, 1921

1,498,373

2 Sheets-Sheet 2

Inventor:-
M. W. Harvey
by Hubert E Peck
atty

Patented June 17, 1924.

1,498,373

UNITED STATES PATENT OFFICE.

MARTIN WILLIAM HARVEY, OF LONDON, ENGLAND.

MOLDING MACHINE OR PRESS.

Application filed November 2, 1921. Serial No. 512,351.

*To all whom it may concern:*

Be it known that I, MARTIN WILLIAM HARVEY, a subject of the King of Great Britain and Ireland, and resident of London, England, have invented new and useful Improvements in or Relating to Molding Machines or Presses, of which the following is a specification.

This invention is for improvements in or relating to molding machines or presses and has for its object to provide a machine which will mould articles of a plastic or mouldable material, such as concrete building blocks, partition slabs, paving slabs, composition blocks, bricks and the like. A further object is to provide a machine which is entirely, or to any desired extent, automatic in its action, so that no labor is required beyond that for supplying the mouldable material, and removing the moulded article.

According to this invention, there is provided in a machine for the purpose set forth, the combination of a rotatable mould carrying table, means for intermittently rotating it, a hopper or like vessel whereto the mouldable material is supplied, automatic means for agitating the mouldable material in the hopper, means for automatically filling a mould when brought into position below the hopper, a press, and means for automatically operating said press when a previously filled mould is brought into position under it, with or without means for automatically ejecting the moulded article from a mould after it has been compressed.

If desired the moulds may be open, top and bottom, and a pallet or bottom is delivered into each mould immediately prior to the filling operation, and is removed with the article when moulded. Preferably, also there is provided a movable abutment or bed plate which is arranged automatically to engage the underside of a mould, or of a pallet, simultaneously with the operation of the press so as to ensure that the desired pressure is exerted on the material in the mould.

In order that the invention, the nature of which has been set forth, may be clearly and readily understood, a complete machine constructed according to this invention and constituting an embodiment thereof will now be described with reference to and by the aid of the accompanying drawings, on which:—

Figure 1:
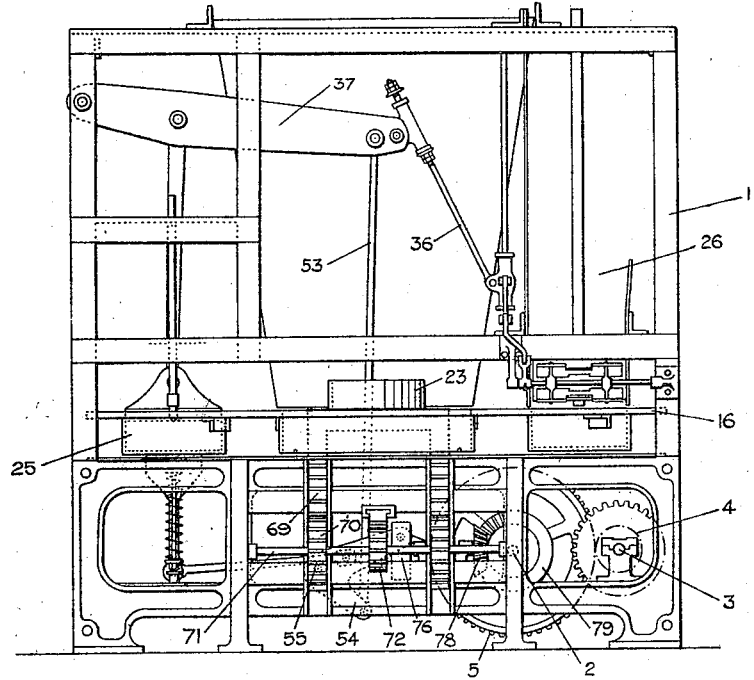
Figure 2:
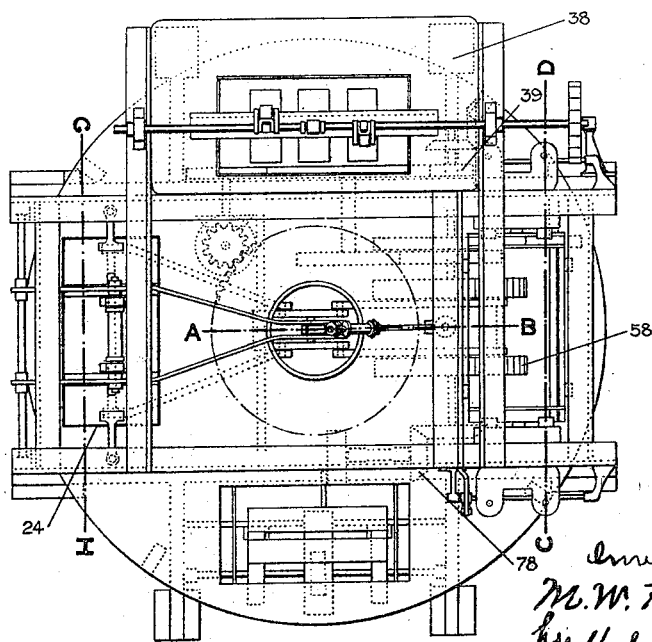
Figure 3:
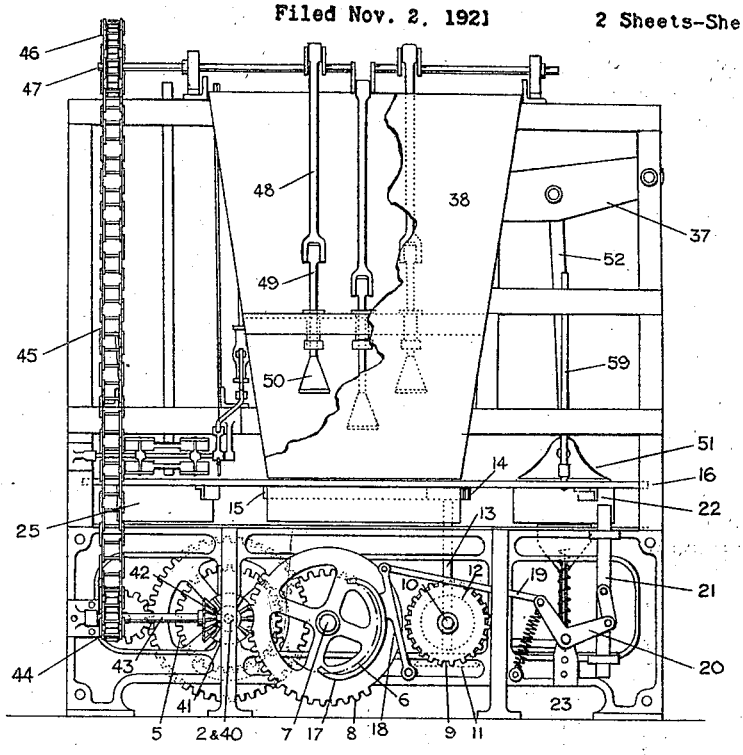
Figure 4:
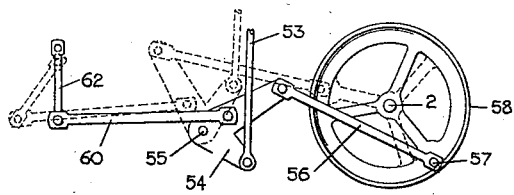
Figure 6:
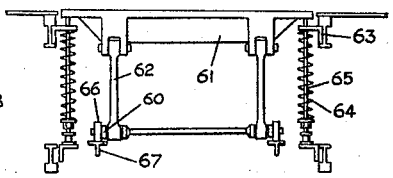
Figure 5:
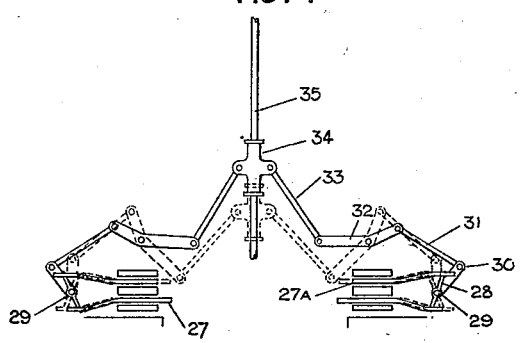
Figure 7:
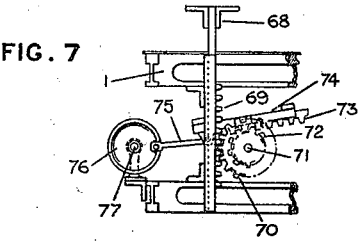

Fig. 1 is an elevation of the ejector side of the machine, the agitator and chain drive being omitted;

Fig. 2 a plan view;

Fig. 3 an elevational view of the hopper side of the machine;

Fig. 4 a section on the line A—B of Fig. 2;

Fig. 5 a section on the line C—D of Fig. 2;

Fig. 6 a section on the line G—H of Fig. 2;

Fig. 7 is a detail view of part of the ejector mechanism.

1 is a framework which has mounted in it a horizontally disposed main shaft 2 from which the other parts of the machine are driven. The main shaft 2 is driven by an electric motor or other prime mover either directly or indirectly, as shown, through an intermediate shaft 3 and gearing 4. On the main shaft 2 is a spur wheel 5 which meshes with a spur wheel 6 on a shaft 7: the shaft 7 carries a mutilated gear wheel 8 having teeth extending around about one half of its periphery. The gear wheel 8 meshes intermittently with a toothed wheel 9 on a shaft 10 on which is also mounted a bevel wheel 11. The bevel wheel 11 meshes with a bevel wheel 12 on a vertical shaft 13. On the vertical shaft 13 is mounted a pinion 14 which meshes with a circular rack 15 mounted on the lower face of a circular table 16 mounted to rotate about a vertical axis. It will be seen from the foregoing that the table 16 is rotated intermittently or in a step by step manner. The gearing employed is such that the table each time it is set in motion is rotated through an angle of 90°. The table is prevented from movement when the driving means are inoperative by automatically acting locking means: these means are actuated from the gear wheel 8 on one face of which is mounted a cam 17. Co-operating with the cam 17 is a lever 18 that is connected by a link 19 with one arm of a bell crank lever 20, the other arm of which is linked to a vertically movable and guided rod 21. The rod 21 is situated below the table 16 and adjacent the edge thereof. 22 are buffers, four in number, mounted on the lower side of the table, uniformly spaced apart and adapted to be engaged by the rod 21. The lever 18 and rod 21 are acted upon by a spring 23 which tends to move the rod 21 towards its locking position. The table 16 has a central circular opening 23 and near the periphery other openings 24, four are shown, uniformly spaced apart to constitute or contain mould boxes 25, which are open top and bottom, and otherwise are shaped to the desired configuration of the article to be produced.

A magazine 26 is mounted on the framework 1 above the table 16 so that the moulds 25 can be brought under it by rotation of the table. The magazine contains a number of pallets or members to constitute the bottoms of the moulds. The magazine 26 may be inclined or vertical, the pallets being positioned therein one upon another and supported at opposite ends of the magazine by one or other of two movable supports 27, 27ᵃ. The supports 27, 27ᵃ comprise plates placed one above the other and connected at their outer ends by a pin and slot connection with the ends of levers 28 (Fig. 5). The levers 28 are mounted on a shaft 29 which also carries an arm 30 connected by a link 31, bell crank lever 32 and link 33 with a sleeve 34 mounted to slide on a vertical rod 35. The sleeve is connected by a rod 36 with the outer or free ends of levers 37 hereafter referred to. From the foregoing it will be seen that when shafts 29 are oscillated, the plates 27, 27ᵃ are caused to move in opposite directions. The pallets are, in the position of parts shown in Fig. 5, supported on plates 27: when these move outward on actuation of shafts 29, the plates 27ᵃ are forced inwardly between the bottom pallet and the pallet resting thereon and at the same time the plates 27 move from below the bottom pallet which drops into the mould 25, the remainder of the pallets then being supported by the plates 27ᵃ until the plates 27 are again moved inwardly. Each mould 25 has cross members 25ᵃ on which the pallet rests. The surface of the pallets is given the appropriate shape for producing the articles desired. After a mould has received its pallet, the table 16 is rotated by the intermittently acting gear described through an angle of 90° and the mould containing the pallet is brought below the hopper 38 mounted on the upper part of the framework and containing the concrete or other material to be moulded.

The mutilated gear wheel 8 also meshes intermittently with a pinion 39 mounted on a short shaft 40 on which is also mounted a bevel wheel 41 which meshes with a bevel wheel 42 on a shaft 43. On the shaft 43 is also mounted a chain wheel 44 which is geared through a chain 45 with a chain wheel 46 mounted on a shaft 47 situated at the upper part of the framework 1 and extending over the upper part of the hopper 38. The shaft 47 is cranked and on each crank pin is mounted the one end of a connecting rod 48 which operates a vertically guided rod 49 carrying a tamping foot 50 (Fig. 3). The tamping feet 50 when moved up and down act as agitators and stir and mix up the material in the hopper 38 so that a uniform and homogeneous mixture is delivered from the hopper to the mould: the material as it is delivered to the mould is also acted on by the tamping feet 50 and tamped. The bottom of the hopper 38 and the table 16 are in close proximity so that the table constitutes a bottom closure to the hopper. In certain circumstances it may be necessary or desirable to provide other closure for the bottom of the hopper, such closure being removed when it is desired to fill a mould and operated automatically by a member fixed on the table or by a member moving synchronously with the table or by hand.

After a mould has been filled the next movement of the table 16 brings it under the press, which is constituted by a pressure member or plate 51 suspended by rods 52 from the levers 37. The levers 37 are pivotally mounted at one of their ends on the framework 1 and are of such shape that their other ends come adjacent and are coupled together. The secondly mentioned ends of the levers 37 are connected with the rod 36 already referred to and with the one end of a vertically disposed link 53, which extends downward and through the central circular opening 23 in the table 16, below which it is connected with one arm of a bell crank lever 54 mounted on a shaft 55 (Fig. 4). The bell crank lever 54 is in duplicate, the lower end of the link 53 coming between and being connected to each of the levers. The other arms of the bell crank levers 54 are each connected by a rod 56 with a crank pin 57 on a crank-arm or wheel 58 mounted on the main driving shaft 2. The pressure plate or member 51 is provided with one or more, preferably and as shown, two tapered pins 59 which move with it to engage holes in the table 16, and thereby locate it accurately in position before the pressure plate or member 51 engages and compresses the material in a mould.

Each bell crank lever 54 has coupled to it a second connecting rod 60 for the purpose of operating a bed plate or abutment 61 which is raised and lowered in opposition to the movement of the pressure medium or plate so as to relieve the table 16, mould and other parts of the excessive unbalanced stresses which are set up in the pressing operation. The connecting rods 60 are connected with the bed plate or abutment 61 through links 62. The bed plate 61, when the bell crank levers 54 are in the dotted line positions (Fig. 4), rests on angle irons 63 (Fig. 6). Springs 64 encircle rods 65 which constitute guides for the bed plate 61. When the bell crank levers 54 are moved to the full line position (Fig. 4) the links 62 are caused to move to a more or less vertical position and to push upward the bed plate. When the links 62 are moved to an inclined position and the bed plate is lowered, the springs 64 act on the latter and assist and quicken its downward movement. The bed plate 61 is held in its raised position by the links 62, the pin connecting the links 62 having rollers 66 on its ends which rest on bearers 67.

The next movement of the table 16 brings the mould with the compressed material in it into position for delivery of the moulded article. This is effected by ejector mechanism which comprises a pair of angle irons 68 mounted on the upper ends of a pair of vertically guided racks 69. Meshing with each rack 69 is a gear wheel 70: the gear wheels 70 are mounted on a shaft 71 which also carries a gear wheel 72. The gear wheel 72 meshes with a rack 73 contained and movable within a member 74 carried by a part of the framework 1. The rack 73 is connected by a link 75 (Fig. 7) with a crank pin on a wheel or crank-arm 76, which if a wheel also acts as a fly wheel, mounted on a shaft 77 which also carries a bevel wheel 78 that meshes with a bevel wheel 79 on the main shaft 2. The bevel wheel 79 is a mutilated wheel and it imparts intermittent motion to the bevel wheel 78 so that the bevel wheel 78 remains stationary when the table 16 is in motion and also momentarily when the moulded article is being removed. The moulded article is removed laterally by a suitable pusher or by hand. The pallet may be ejected with the article or separately as desired. After the ejecting operation is completed, the table 16 makes another partial rotation to bring the mould again into position to receive a pallet from the magazine aforesaid, the cycle of operations is recommenced.

It will be understood that any desired number of moulds are used on the table, so that for each step by step movement of the table, an operation is performed in or for each mould and the process of manufacture approximates to a continuous one; since all the parts are operated from the single main driving shaft, all the operations are exactly synchronized, and the accurate registration of the table is effected by the taper pins aforesaid. The whole machine can, therefore, be entirely automatic and can work at any desired speed, the speed being usually determined by the rate at which the material can be delivered into the moulds.

It is to be understood that the invention is not restricted to the particular construction of machine hereinbefore described, for obviously the mechanical details can be varied within wide limits without departing from the scope of the present invention.

What I claim is:—

In a molding machine, the combination of a rotatable mold carrying table, means for intermittently rotating said table, a hopper for moldable material, means for automatically filling a mold when brought into filling position with said hopper by said rotatable table, and means for delivering a bottom to each mold prior to filling thereof comprising, a pair of superposed plates operated simultaneously in opposite directions to alternately support and release a mold bottom.

Dated this 18th day of October, 1921.

MARTIN WILLIAM HARVEY.